(12) United States Patent
Hogan

(10) Patent No.: US 7,025,426 B2
(45) Date of Patent: Apr. 11, 2006

(54) SOUND DAMPENING ADHESIVE PATTERNS FOR VEHICLE WHEEL ASSEMBLIES

(75) Inventor: Scott A. Hogan, Sylvan Lake, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 24 days.

(21) Appl. No.: 10/790,539

(22) Filed: Mar. 1, 2004

(65) Prior Publication Data

US 2005/0189812 A1 Sep. 1, 2005

(51) Int. Cl.
*B60B 7/06* (2006.01)

(52) U.S. Cl. .................. 301/37.11; 301/37.43

(58) Field of Classification Search ......... 301/37.101, 301/37.27, 37.42, 37.43, 37.11, 37.102; 156/60, 156/75, 87

See application file for complete search history.

(56) References Cited

U.S. PATENT DOCUMENTS

| | | |
|---|---|---|
| 3,669,501 A | 6/1972 | Derleth |
| 5,368,370 A | 11/1994 | Beam |
| 5,461,779 A | 10/1995 | Beam |
| 5,595,423 A | 1/1997 | Heck |
| 5,597,213 A | 1/1997 | Chase |
| 5,664,845 A | 9/1997 | Maloney |
| 6,007,158 A | 12/1999 | Maloney |
| 6,286,908 B1 * | 9/2001 | Maloney et al. ......... 301/37.43 |
| 6,554,371 B1 * | 4/2003 | Maloney et al. ......... 301/37.43 |
| 6,729,695 B1 * | 5/2004 | Woelfel ................ 301/37.43 |
| 6,932,435 B1 * | 8/2005 | Cutcher et al. .......... 301/37.11 |

* cited by examiner

*Primary Examiner*—Russell D. Stormer
*Assistant Examiner*—Jason R. Bellinger
(74) *Attorney, Agent, or Firm*—Butzel Long

(57) ABSTRACT

Wheel assemblies that include decorative wheel covers which are bonded to wheels by sound dampening adhesive patterns that include primary adhesive patterns that are sufficient to secure the wheel covers to the wheels and an auxiliary adhesive patterns that include discrete portions that are provided in hollow portions defined by the primary adhesive patterns between the wheel covers and wheels. The discrete portions of the auxiliary adhesive patterns prevent the hollow portions from sounding hollow.

21 Claims, 8 Drawing Sheets

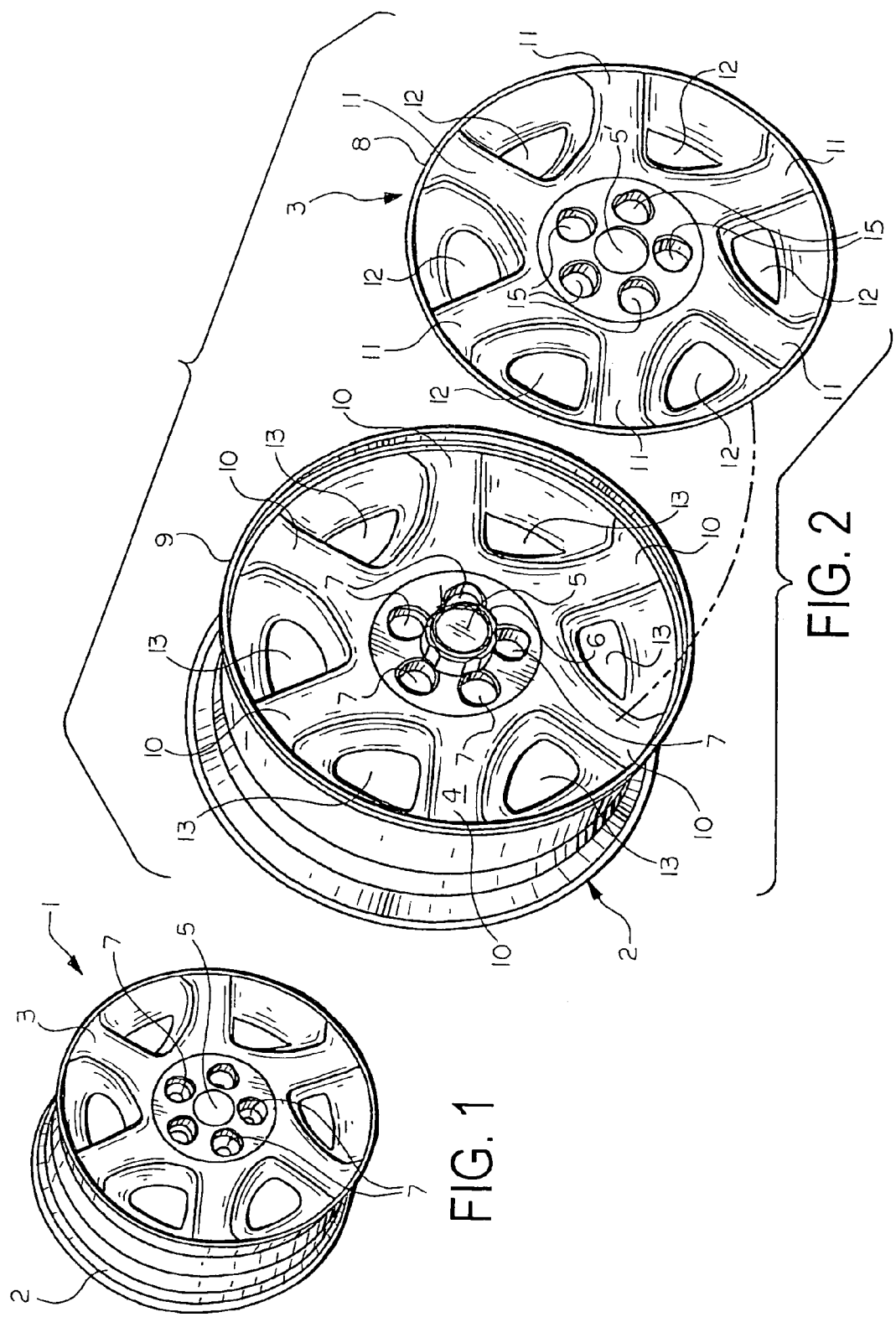

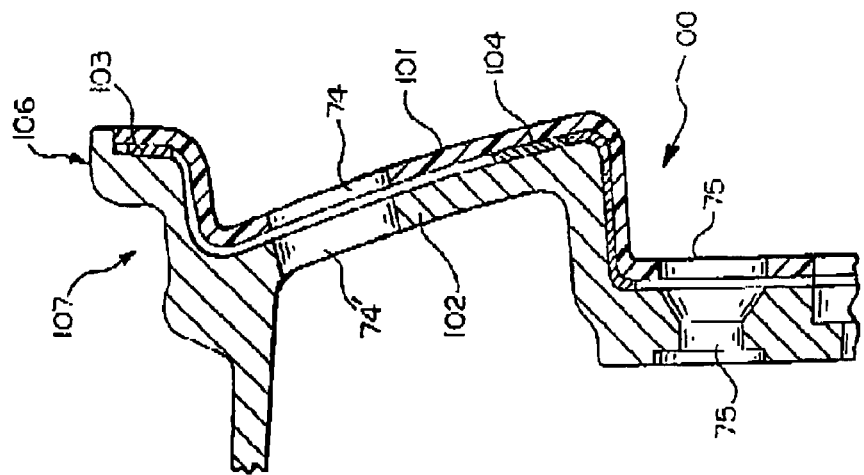
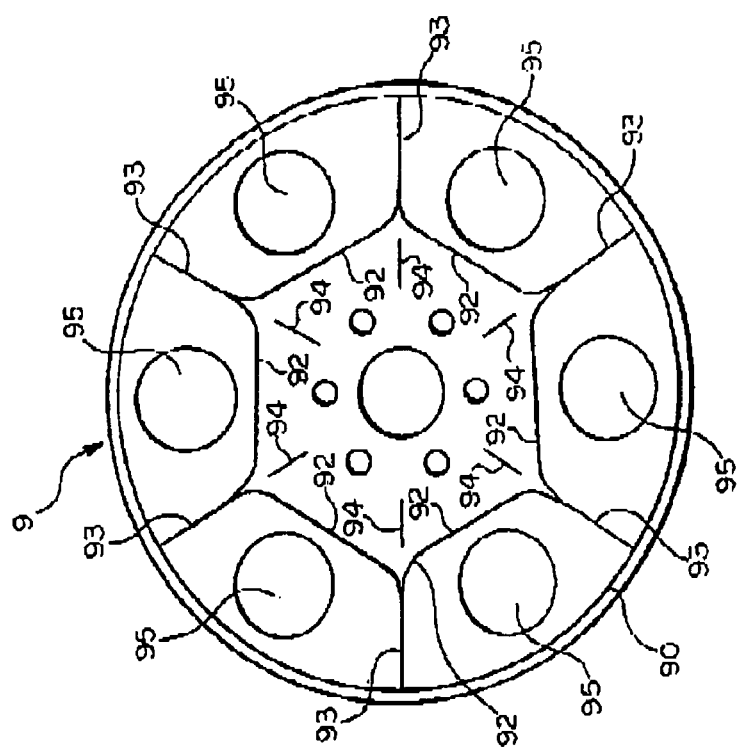

SOUND DAMPENING ADHESIVE PATTERNS FOR VEHICLE WHEEL ASSEMBLIES

TECHNICAL FIELD

The present invention relates to vehicle wheels that have decorative wheel covers secured over the wheel for aesthetic purposes. More specifically, the present invention relates to methods for adhesively securing decorative wheel covers to wheels which methods involve the use of primary adhesive patterns together with auxiliary adhesive patterns that provide noise dampening functions.

BACKGROUND ART

Wheel assemblies that utilize wheel appliqués to decorate the external or outboard surfaces of plain steel wheels are well known and are far less expensive to produce than decorative wheels that have to be formed and finished.

Wheel appliqués can be secured to wheels by various mechanical engaging structures and/or by adhesives. U.S. Pat. No. 5,664,845 to Maloney et al. discloses a vehicle wheel cover retention system in which the annular lip of the wheel cover is configured to spring outwardly into a groove provided in the inner surface of the wheel. U.S. Pat. No. 5,595,423 to Heck et al. discloses a vehicle wheel cover retention system in which the outer edge of the wheel cover is deformed to cover the outer peripheral edge of the outboard bead seat retaining flange of the wheel. Both U.S. Pat. No. 5,664,845 to Maloney et al. and U.S. Pat. No. 5,595,423 to Heck et al. utilize an adhesive in cooperation with their respective mechanical engaging structures.

Many wheel assemblies include decorative wheel covers that are adhesively attached to underlying wheels. U.S. Pat. No. 3,669,501 to Derleth discloses the use of a foamable adhesive that is used to secure a decorative cover to a wheel. The decorative cover in Derleth is configured to have variations in contour in a direction transverse to the axis of the wheel which exceed the variations in the rim and/or disc contour of the wheel, which variations would be extremely difficult and expensive, if not impossible, to stamp or draw in the disc of the wheel. During assembly, a foamable adhesive is coated on the wheel, and the decorative cover is then quickly clamped to the wheel before the adhesive begins to foam. As the adhesive foams, void spaces between the wheel and cover are filled with the foamable adhesive.

Turbine openings are a necessary element in today's wheel systems in providing proper cooling to brake systems. In addition, the aesthetics of endless configurations of turbine openings add individuality and style to vehicle wheels. The inclusion of turbine openings in wheels and wheel covers creates problems with the use of adhesives. In order to use foamable adhesives, it is necessary to use some additional structure to seal large openings such as turbine openings to prevent the foamable adhesive from escaping through the openings rather than spread evenly or completely between a wheel and wheel cover.

U.S. Pat. Nos. 5,368,370 and 5,461,779 to Beam disclose an ornamental appliqué formed on a uniform thickness of stainless steel sheet stock that requires attachment to a wheel by the use of a full surface curable adhesive uniformly deposited between the stainless steel cover and a mechanical locking arrangement. The mechanical locking arrangement consists of an undercut in the rim of the wheel into which the cover nests and a hole in the wheel aligned with a hole in the appliqué wherein a lug stud is permanently attached to create a mechanical lock that, according to Beam's teachings, spreads the curable adhesive into a uniform layer and compresses the ornamental appliqué to the wheel until the adhesive cures.

Beam's teachings exemplify an early concern that adhesives used to secure wheel covers onto wheel assemblies had to be applied as continuous coatings between the wheel covers and wheels in order to secure the attachment and prevent moisture and dirt from entering any gaps between the wheel covers and wheels and causing corrosion to develop.

There are some restrictions on the types of adhesives that can be used to secure wheel covers to wheels and considerations on how to apply some adhesives. Suitable adhesives have to withstand the high temperatures generated by tires, wheels and breaking systems. In the case of air-cured and moisture-cured adhesives, it has been discovered that the use of continuous coatings of the adhesives between wheel covers and a wheels adversely effects cure time.

U.S. Pat. No. 5,597,213 to Chase exemplifies the use beads of adhesive that are provide in parallel as separated lines of adhesive rather than a continuous layer to create voids so as to reduce the amount of curing time of the adhesive and thereby reduce manufacturing time and costs. In Chase, air between the lines of adhesives is "captured" between the overlay and the wheel to assist in curing the adhesive. In the case of adhesives that are moisture-cured, Chase proposes introducing high humidity air into the assembly process and the technique of selective application of the adhesive can be utilized to establish voids between lines of adhesive that serve to entrap moisture laden air which further enhances cure times and reduces overall costs of the manufacturing process.

U.S. Pat. No. 6.00,158 to Maloney et al. teaches a vehicle cover retention system and method for producing the same. Maloney et al. applies an adhesive in a pattern, which when pressed between the wheel cover and wheel can fill less that the entire gap between the wheel cover and wheel, but nevertheless is effective to prevent water, mud and debris from entering into any voids or gaps between the wheel cover and wheel.

Adhesive patterns exemplified in FIG. 6 of Maloney et al. are designed to establish seals that prevent water, mud and debris from entering any voids, gaps or other spaces between the wheel covers and the wheels. The concern remains that if such water, mud and debris enter any voids, gaps or other spaces between the wheel covers and the wheels, it will eventually cause corrosion to occur between the wheel covers and wheel and result in detachment of the wheel cover or at least an unsightly appearance.

The present invention provides a method for adhesively securing decorative wheel covers to wheels which methods involve the use of primary adhesive patterns and auxiliary adhesive patterns that are not found in the prior art.

DISCLOSURE OF THE INVENTION

According to various features, characteristics and embodiments of the present invention which will become apparent as the description thereof proceeds, the present invention provides a method of securing a wheel cover to a wheel to form a wheel assembly which method comprises:

providing a wheel having an outboard surface with a plurality of centrally located lug bolt apertures formed in the outboard surface and a plurality of openings formed in the outboard surface and spaced radially outwardly from the lug bolt apertures;

providing a wheel cover having an inner surface and a plurality of centrally located lug bolt apertures formed in the wheel cover which correspond to the lug bolt apertures of the wheel, and a plurality of decorative openings formed in the wheel cover and spaced radially outwardly from the lug bolt apertures, which plurality of openings correspond to the plurality of openings formed in the wheel cover;

applying a primary adhesive pattern to at least one of the outboard surface of the wheel or the inner surface of the wheel cover;

applying an auxiliary adhesive pattern to at least one of the outboard surface of the wheel or the inner surface of the wheel cover; and assembling the wheel cover to the wheel to cause the primary and auxiliary adhesive patterns to contact both the outboard surface of the wheel and the inner surface of the wheel cover and thereby enable the adhesive pattern to secure the wheel cover to the wheel and define a space between the wheel cover and wheel which is not filled with adhesive, the primary adhesive pattern being sufficient to secure the wheel covet to the wheel and comprising a configuration of beads of adhesive that do not fill the entire space between the wheel cover and the wheel, the auxiliary adhesive pattern being insufficient to secure the wheel cover to the wheel and comprising a configuration of discrete beads of adhesive that are provided in portions of the space between the wheel cover and the wheel which are hollow.

The present invention further provides a wheel assembly which comprises:

a wheel having an outboard surface with a plurality of centrally located lug nut apertures formed in the outboard surface and a plurality of openings formed in the outboard surface and spaced radially outwardly from the lug nut apertures;

a wheel cover having an inner surface and a plurality of centrally located lug nut apertures formed in the wheel cover which are aligned with the lug nut apertures of the wheel, and a plurality of decorative openings formed in the wheel cover and spaced radially outwardly from the lug nut apertures, which plurality of openings are aligned with the plurality of openings formed in the wheel cover;

a cured primary adhesive pattern between the wheel and wheel cover which bonds the wheel and wheel cover together with a space between the wheel and wheel cover which space is not filled with the cured primary adhesive; and a cured auxiliary adhesive pattern that is insufficient to secure the wheel cover to the wheel and comprises a configuration of discrete beads of adhesive that are provided in portions of the space between the wheel cover and the wheel which are hollow.

The present invention further provides a method of reducing hollow sounds in wheel assemblies which method comprises:

providing a wheel having an outboard surface with a plurality of centrally located lug bolt apertures formed in the outboard surface and a plurality of openings formed in the outboard surface and spaced radially outwardly from the lug bolt apertures;

providing a wheel cover having an inner surface and a plurality of centrally located lug bolt apertures formed in the wheel cover which correspond to the lug bolt apertures of the wheel, and a plurality of decorative openings formed in the wheel cover and spaced radially outwardly from the lug bolt apertures, which plurality of openings correspond to the plurality of openings formed in the wheel cover;

applying a primary adhesive pattern to at least one of the outboard surface of the wheel or the inner surface of the wheel cover, the primary adhesive pattern defining areas that will be hollow when the wheel cover and the wheel are bonded together by the primary adhesive pattern;

applying an auxiliary adhesive pattern to at least one of the outboard surface of the wheel or the inner surface of the wheel cover, the auxiliary adhesive pattern consisting of discrete beads of adhesive that will be positioned in the hollow areas defined by the primary adhesive pattern; and assembling the wheel cover to the wheel to cause the adhesive to contact both the outboard surface of the wheel and the inner surface of the wheel cover and thereby enable the primary adhesive pattern to secure the wheel cover to the wheel.

BRIEF DESCRIPTION OF DRAWINGS

The present invention will be described with reference to the attached drawings which are given as non-limiting examples only, in which:

FIG. 1 is a perspective view of a wheel assembly according to one embodiment of the present invention.

FIG. 2 is an exploded perspective view of the wheel assembly of FIG. 1.

FIGS. 5a–5c are exemplary adhesive patterns according to the present invention that include primary and auxiliary adhesive patterns.

FIG. 6 is a cross-sectional view of a wheel assembly according to one embodiment that includes an adhesive pattern similar to that shown in FIG. 5a taken along section line VI—VI.

BEST MODE FOR CARRYING OUT THE INVENTION

Figure 3A:
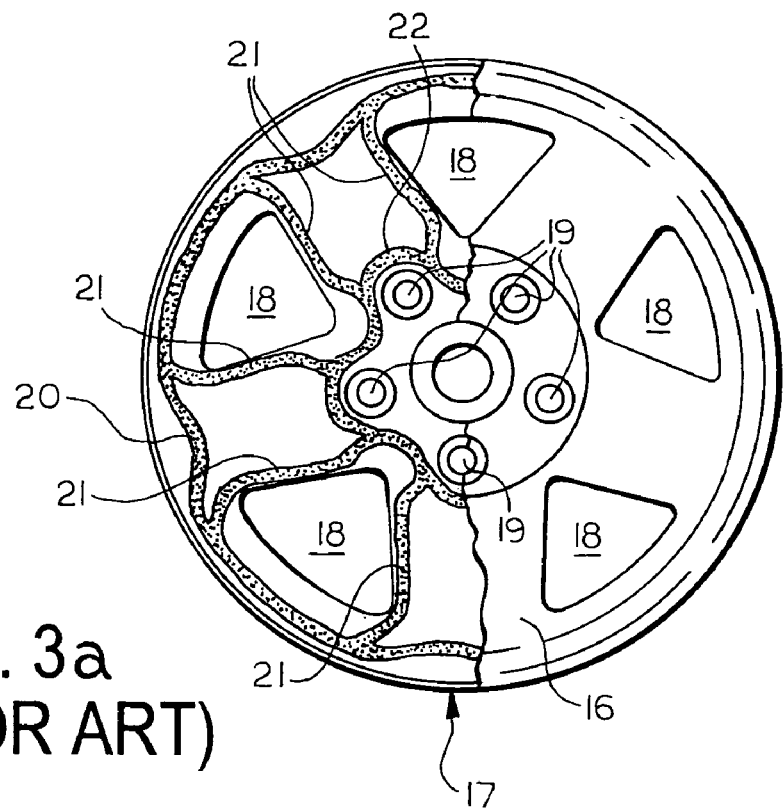
FIGS. 3a–3h are examples of prior art adhesive patterns used in wheel assemblies.

FIG. 1 is a perspective view of a wheel assembly according to one embodiment of the present invention. The wheel assembly which is generally identified by reference numeral 1 includes a wheel 2 that can be made of aluminum, magnesium, steel, or other material conventionally used for manufacturing vehicle wheels. A decorative wheel cover 3 is bonded to the otherwise outer exposed surface 4 (See FIG. 2) of wheel 2. The wheel cover 3 is a solid panel of a high-impact plastic that has a high temperature resistance or can be a thin metallic panel such as stainless steel that, in either case has a finished outer surface that can be painted, textured or plated, e.g. chrome plated as desired. An advantage of using a high-impact plastic material such as a combination of polycarbonate and ABS is that wheel covers 3 made from such materials can be injection molded.

Wheel 2 is of the type which includes a small central opening 5 in the wheel hub 6 and a plurality of exposed lug bolt apertures 7 arranged in a circular pattern and spaced for the particular vehicle on which wheel assembly 1 is to be employed. Opening 5 will typically be enclosed by a relatively small cap while the lug nuts themselves (not shown) are exposed once the wheel assembly 1 is mounted to a vehicle.

Wheel cover 3 has a geometry and contour which substantially conforms to that of wheel 2, namely, an outer peripheral edge 8 which matingly fits within rim 9 of wheel 2. Spokes 11 extend radially outwardly from the center hub opening 5' which correspond in size, shape and location to the spokes 10 on wheel 2. Between the spokes 11 of wheel cover 3 are decorative openings or windows 12 that are shaped to conform to corresponding decorative openings or windows 13 in wheel 2. The central hub area surrounding central opening 5' of wheel cover 3 also includes a plurality of lug bolt receiving openings 15 which align with and are received within openings 7 in wheel 2 when the wheel cover 3 is position on the wheel 2. The central opening 5' of the wheel cover 3 is aligned with opening 5 in wheel hub 6, as best seen in FIG. 1. When the wheel cover 3 is bonded to wheel 2, the wheel cover 3 appears as an integral outer surface of the wheel 1, as depicted in FIG. 1.

The wheel cover 3 is bonded to wheel 2 by a primary adhesive pattern that is configured to securely bond the wheel cover 3 to the outboard face of the wheel 2. The primary adhesive pattern can include any known adhesive pattern that bonds the wheel cover 3 to the outboard face of the wheel 2 or an adhesive pattern, as discussed below, which is configured to avoid sealing off areas between a wheel cover and a wheel.

In addition to the primary adhesive pattern, the present invention includes an auxiliary adhesive pattern that comprises discrete lines or beads of adhesive which are not provided to secure a wheel cover to a wheel, but rather are provided to prevent portions of the wheel cover which are not immediately secured to the wheel by the primary adhesive patterns from sounding hollow.

One of the advantages associated with using adhesive patterns rather than using a continuous layer of adhesive between a wheel cover and a wheel is that less adhesive can be used. Adhesive patterns used by the prior art as exemplified in FIGS. 3a–3h and those exemplified in FIGS. 4a–4c, include areas between beads or lines of adhesive where the wheel covers are not immediately secured to the wheels. Depending on the size of these non-immediately secured areas they can sound hollow when the wheel cover is hit or tapped or they can vibrate. The auxiliary adhesive patterns of the present invention include discrete lines or beads of adhesive that extend into at least partially into the areas that are not immediately secured by the primary adhesive patterns so as to prevent these areas from sounding hollow or from vibrating. As discussed in detail below, the discrete lines or beads of adhesive of the auxiliary adhesive patterns can have one or more terminal end(s) that is/are not connected to any portion of the primary adhesive pattern.

FIGS. 3a–3h are examples of prior art adhesive patterns used in wheel assemblies. Throughout FIGS. 3a–3b common reference numerals have been used to identify similar elements where convenient. FIG. 3a depicts an adhesive pattern that is formed from an unfoamed adhesive which is applied between wheel cover 16 and wheel 17. The adhesive pattern includes a bead 20 of adhesive that extends around the outer perimeter of the assembly, beads 21 of adhesive that surround the edge of each of the turbine openings 18, and a bead 22 of adhesive that collectively surrounds the grouping of lug bolt openings 19.

Figure 3B:
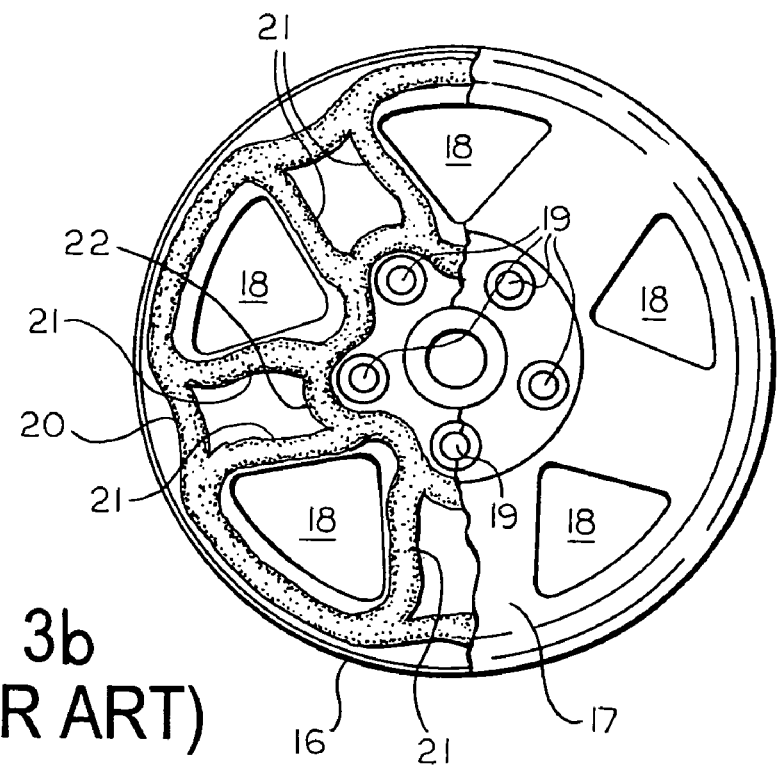

FIG. 3b is an adhesive pattern that is similar to that shown in FIG. 3a. However, in FIG. 3b, a foaming adhesive is utilized. As can be seem from a comparison between FIGS. 3c and 3d, the foaming adhesive will spread to cover a most of the space between the wheel cover 17 and the wheel 16 when the wheel cover 17 and wheel 16 are pressed together.

Figure 3C:
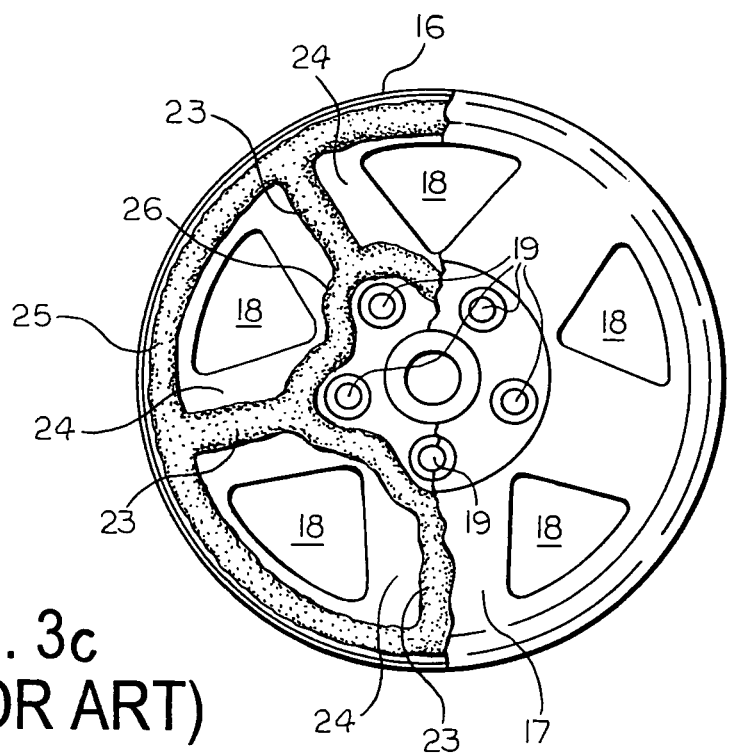

FIG. 3c depicts an adhesive pattern that is formed from a foaming adhesive which is applied between wheel cover 17 and wheel 16. The adhesive pattern shown in FIG. 3c includes a single bead 23 of adhesive that is applied along the central portion of the spokes 24, a single bead 25 of adhesive that extends around the outer perimeter of the assembly, and a bead 26 of adhesive that collectively surrounds the grouping of lug bolt openings 19.

Figure 3D:
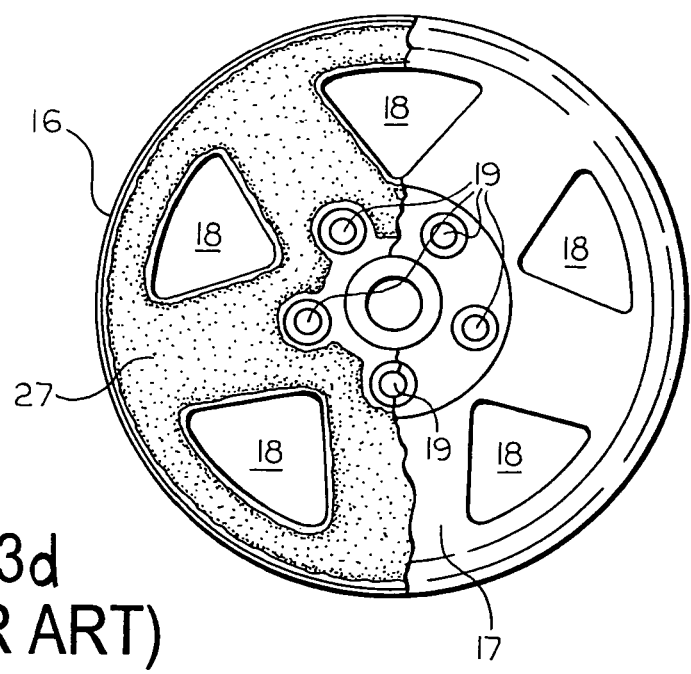

FIG. 3d depicts the manner in which the adhesive pattern of the foaming adhesive 27 of FIG. 3c spreads to cover up to 95% of the surface area between the wheel cover 17 and the wheel 16, when the wheel cover 17 and wheel 16 are pressed together.

Figure 3E:
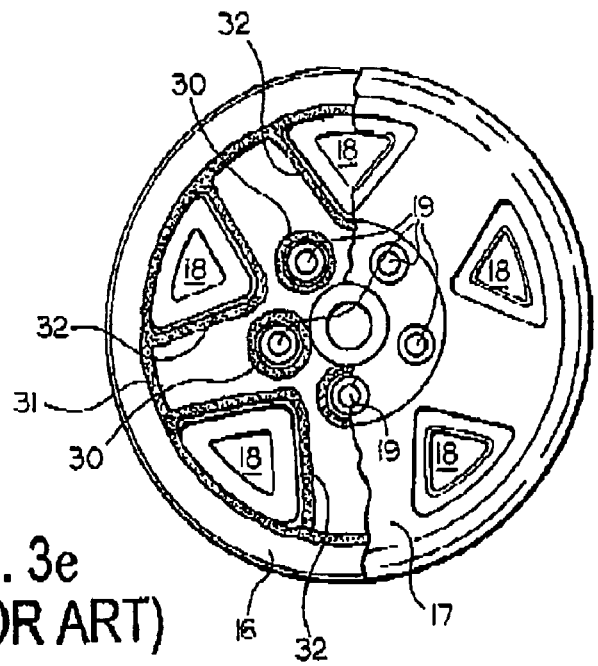

FIG. 3e depicts an adhesive pattern that includes individual beads 30 of adhesive that surround each lug bolt opening 19, a bead 31 of adhesive that extends around the outer perimeter of the assembly and individual beads 32 of adhesive that surround each of the turbine openings 18.

Figure 3F:
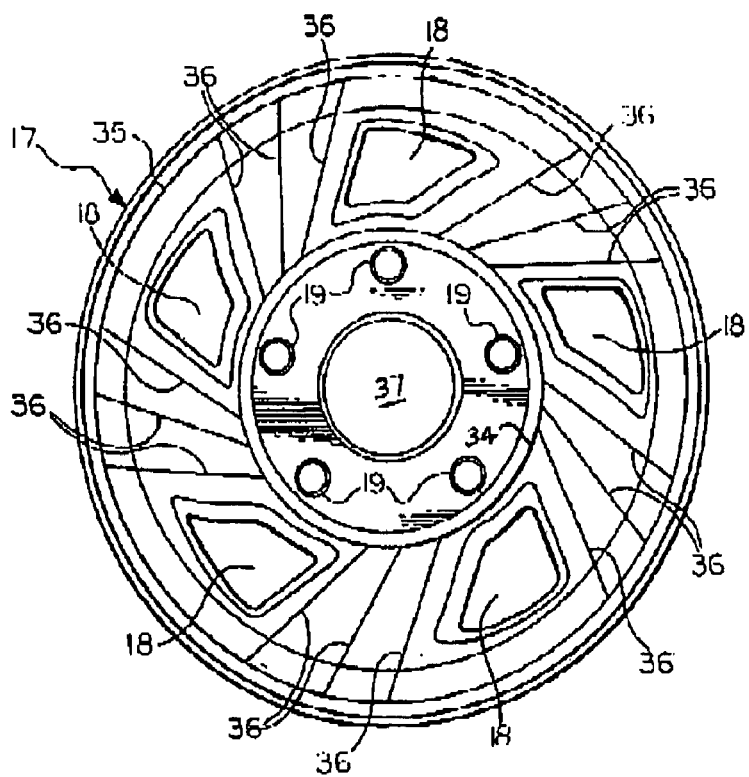

FIG. 3f depicts an adhesive pattern that includes an inner circle of adhesive 34, and outer circle of adhesive 35, and number of radial lines of adhesive 36. The inner circle of adhesive 34 seals off a central hub opening 37 and lug bolt openings 19. The inner circle of adhesive 34, outer circle of adhesive 35, and radial lines of adhesive 36 effectively seal off the decorative openings or windows 18. When the wheel cover 17 is pressed onto the wheel (not shown), the adhesive spreads between the wheel cover 17 and wheel.

Figure 3G:
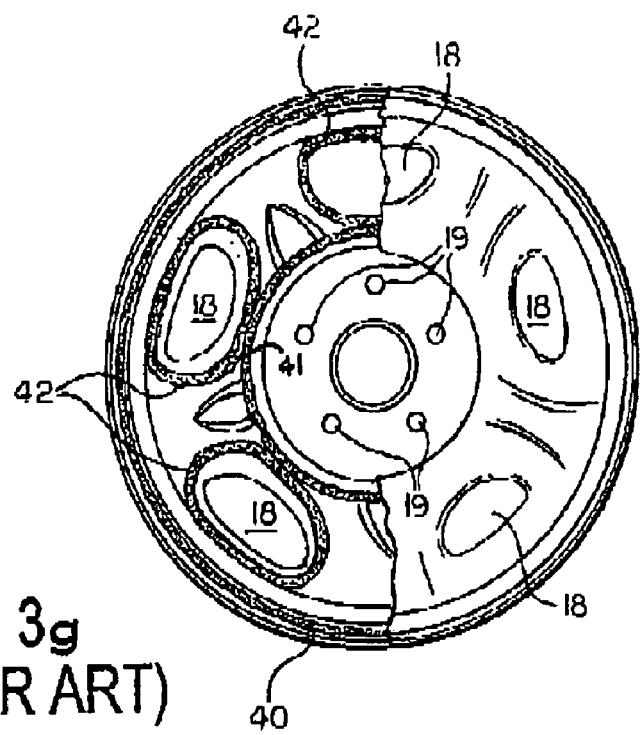

FIG. 3g depicts an adhesive pattern that includes a bead 40 of adhesive that surrounds the outer periphery of the assembly, a bead 41 of adhesive in the from of a circle that collectively surrounds the lug bolt receiving holes 19 and separate beads 42 of adhesive that surround each of the turbine openings or decorative windows 18.

Figure 3H:
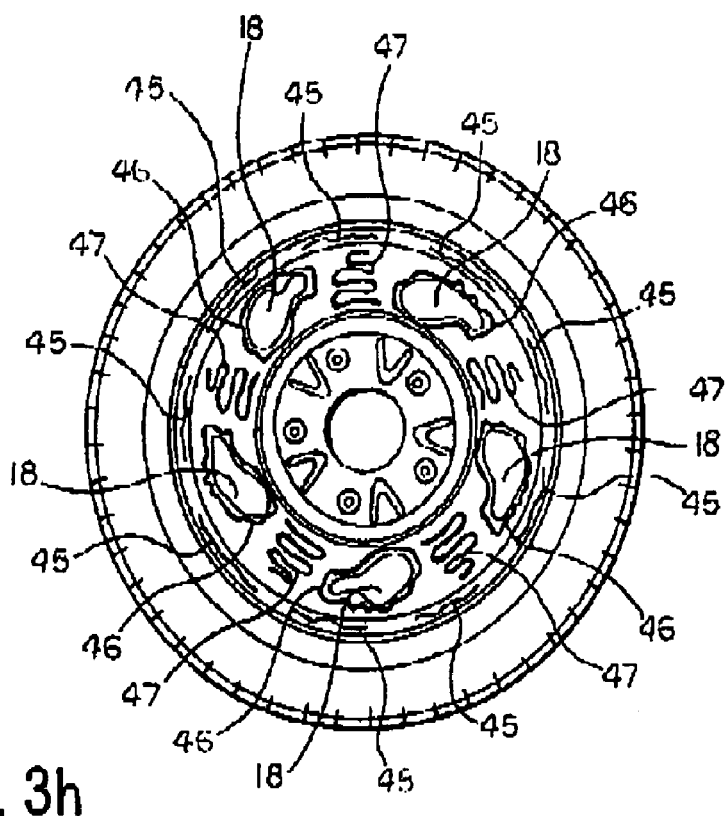

FIG. 3h depicts an adhesive pattern that includes an a bead 45 of adhesive that is intermittently provided around an outer perimeter of the assembly, individual beads 46 of adhesive that surround each opening 18, and beads 47 of adhesive that are provided between openings 18.

The prior art adhesive patterns depicted in FIGS. 3a–3h are each configured and applied to seal the gap between the wheel covers and wheels to keep dirt, water and other debris from getting between the wheel covers and wheels.

Figure 4B:
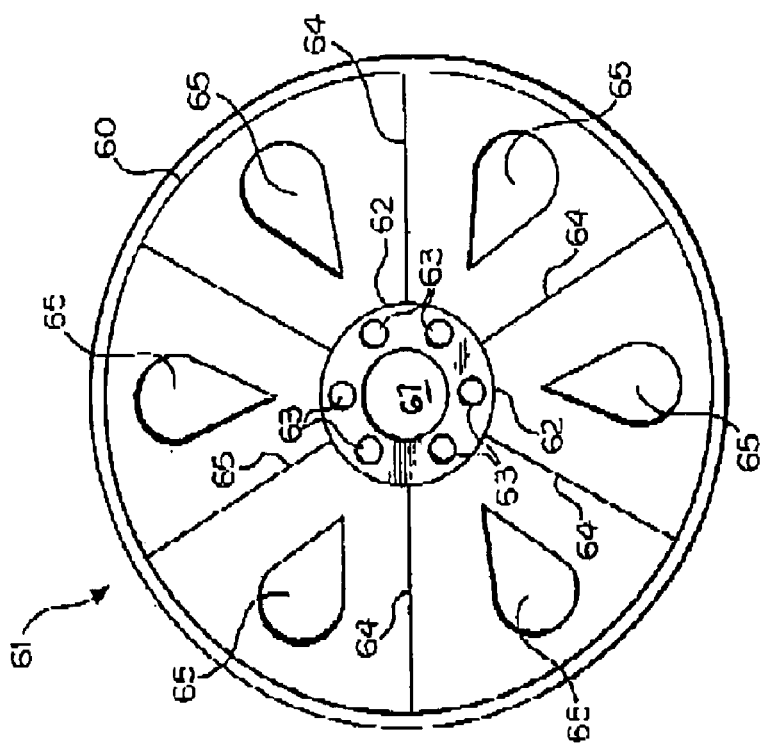
FIGS. 4a and 4b are exemplary adhesive patterns according to embodiments of the present invention that do not seal off areas between a wheel cover and a wheel.
Figure 4A:
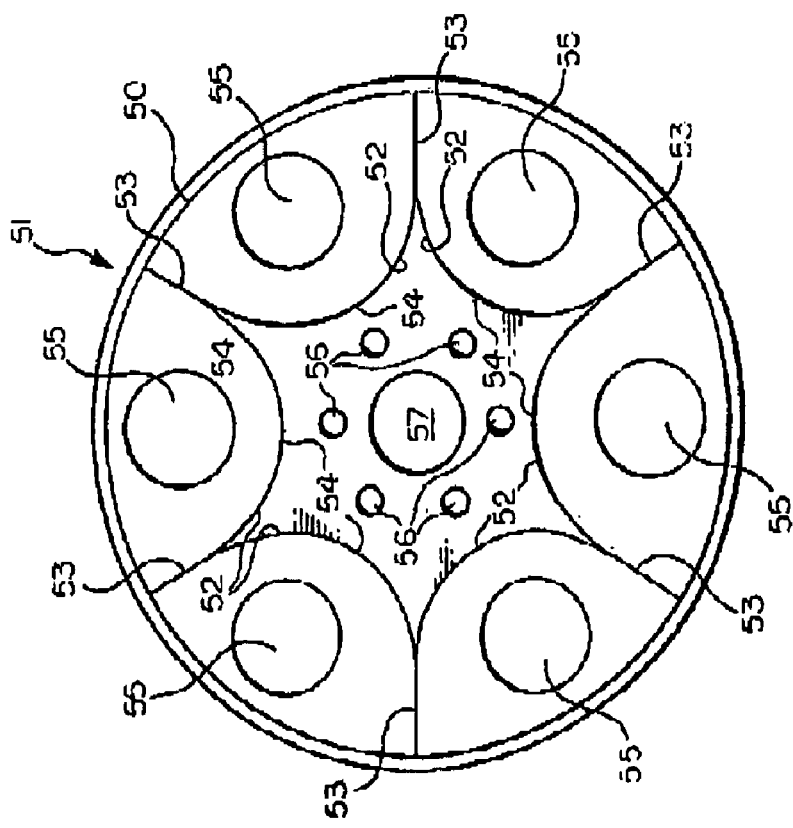

FIGS. 4a and 4b are exemplary adhesive patterns according to one embodiment that do not seal off areas between a wheel cover and a wheel. FIGS. 4a and 4b (and FIGS. 5a–5c) illustrate adhesive patterns that can be provided on either the outboard surface of a wheel or on an inner surface of a wheel cover. For purposes of describing the present invention, it will be assumed that FIGS. 4a and 4b (and FIGS. 5a–5c) illustrate adhesive patterns that are provided on the outboard surface of a wheel and that the corresponding wheel cover includes decorative openings or windows, lug bolt apertures and a central hub opening that are sized, shaped and positioned complementarily to the decorative openings or windows, lug bolt apertures and central hub openings of the wheel.

The adhesive pattern depicted in FIG. 4a includes a circular bead or line of adhesive 50 that extends along the outer peripheral edge of the wheel 51 and a series of adhesive beads or lines 52 that loop inward from the circular bead or line of adhesive 50. The loop beads or lines of adhesive 52 are shown as having common or overlapping leg portions 53 and apexes 54 that are positioned between the decorative openings or windows 55 and the lug bolt openings 56.

It is noted that in FIG. 4a there are no areas surrounded by adhesive beads or lines that are completely sealed, i.e., that do not contain either a decorative opening or window 55 or the lug bolt and central hub openings 56 and 57. Accordingly, when the adhesive pattern shown in FIG. 4a is provided between a wheel cover and a wheel and the two are pressed toward one another, there are no sealed pockets defined by the adhesive pattern in which air can become entrapped and compressed. The adhesive pattern depicted in FIG. 4a allows all the air between the wheel cover and wheel to escape through the decorative openings or windows 55, the lug bolt openings 56 and/or the central hub opening 57.

The adhesive pattern depicted in FIG. 4b includes an outer circular bead or line of adhesive 60 that extends along the outer peripheral edge of the wheel 61 and an inner circular bead or line of adhesive 62 that surrounds the lug bolt openings 63. In addition, the adhesive pattern depicted in FIG. 4b includes a single bead or line of adhesive 64 between each adjacent pair or the decorative openings of windows 65 that extends radially between the outer circular bead or line of adhesive 60 and the inner circular bead or line of adhesive 62.

It is noted that in FIG. 4b there are no areas surrounded by adhesive beads or lines that are completely sealed, i.e., that do not contain either a decorative opening or window 65 or the lug bolt and central hub openings 63 and 67. Accordingly, when the adhesive pattern shown in FIG. 4b is provided between a wheel cover and a wheel and the two are pressed toward one another, there are no sealed pockets defined by the adhesive pattern in which air can become entrapped and compressed. The adhesive pattern depicted in FIG. 4b allows all the air between the wheel cover and wheel to escape through the decorative openings or windows 65, the lug bolt openings 63 and/or the central hub opening 67.

It is to be understood that the adhesive patterns depicted in FIGS. 3a–3h are non-limiting examples of adhesive patterns that are configured to seal dirt, water and other debris from entering between wheel covers and wheels. Likewise, the adhesive patterns depicted in FIGS. 4a and 4b are non-limiting examples of adhesive patterns that do not define sealed pockets in which air can be trapped when the wheel covers and wheels are pressed together. The adhesive patterns useful as the primary adhesive patterns of the present invention include those exemplified by FIGS. 3a-3h that are configured to seal dirt, water and other debris from entering between wheel covers and wheels, and those exemplified by FIGS. 4a and 4b that do not define sealed pockets in which air can be trapped when the wheel covers and wheels are pressed together. The primary adhesive patterns used in the present invention do not include adhesive patterns that form a continuous adhesive layer between the wheel covers and the wheels.

Certain embodiments of the present invention use primary adhesive patterns are configured to avoid establishing the type of seals that are conventionally provided to prevent water, mud and debris from entering any voids, gaps or other spaces between the wheel covers and the wheels. Such adhesive patterns which are useful for purposes of the present invention are a departure from more conventional adhesive patterns that are configured to establish seals that prevent water, mud and debris from entering any voids, gaps or other spaces between the wheel covers and the wheels. More conventional adhesive patterns address concerns that if such water, mud and debris enter any voids, gaps or other spaces between the wheel covers and the wheels, it will eventually cause corrosion to occur between the wheel covers and wheels and result in detachment of the wheel covers or at least an unsightly appearance. However, such prior art adhesive patterns often fail and expedite the deterioration of wheel assemblies, because the beads or lines of adhesive are often breached during assembly as air trapped within the sealed areas becomes compressed when the wheel covers and wheels are pressed together and breaches portions of the beads or lines of adhesive which forms the sealed pocket. As a result, the goal to provide a seal and prevent water, mud and other debris from entering between the cover and the outboard facing surface of the wheel is not met, but rather spoiled. Such a problem is common in wheel assemblies that use adhesive patterns that provide beads or lines of adhesive around the outer peripheral edge of the wheel cover and around each opening, including vent/decorative openings, lug bolt openings (separately or collectively) and wheel hub openings. Such adhesive patterns which are intentionally designed to seal off the gap between the wheel covers and wheel around the outer peripheral edge and openings ironically create pockets of air that becomes pressurized upon assembly and defeats the goal of providing a seal.

The breached areas of the adhesive beads or lines are typically sufficiently small so that water, mud and other debris that passes through the breached areas becomes effectively trapped within pockets that, except for the breached areas, are otherwise sealed. For example, water that enters the pockets through the breached areas can only pass out of the pockets if the water "finds" the breached areas again. This may be difficult when the wheel assembly rotates and the orientation of the pockets and breached areas keep changing.

Figure 5B:
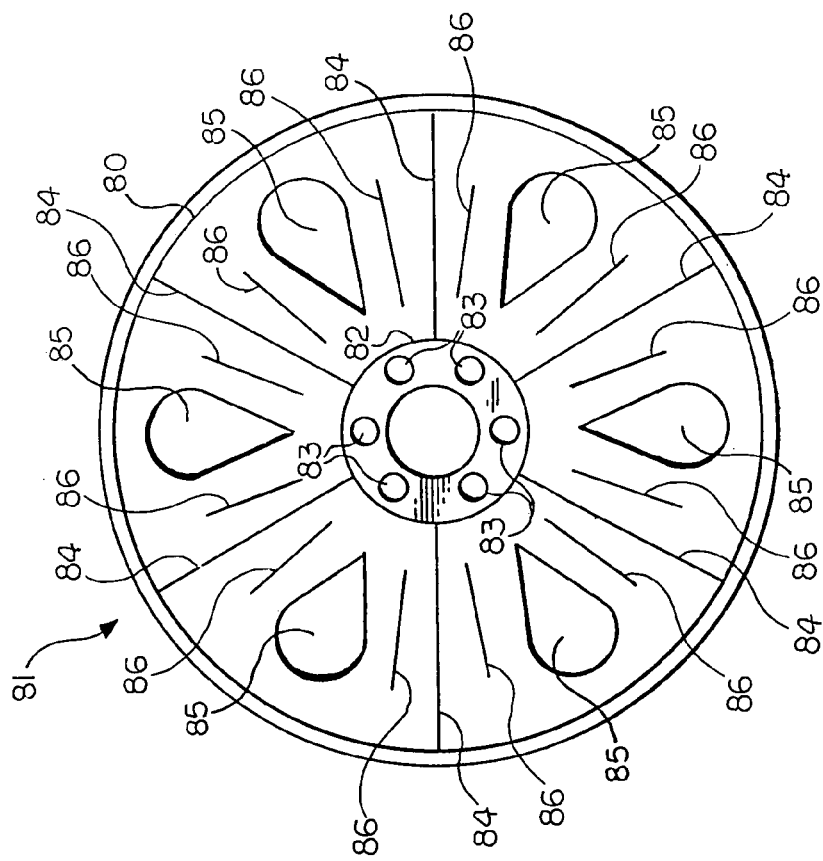
Figure 5A:
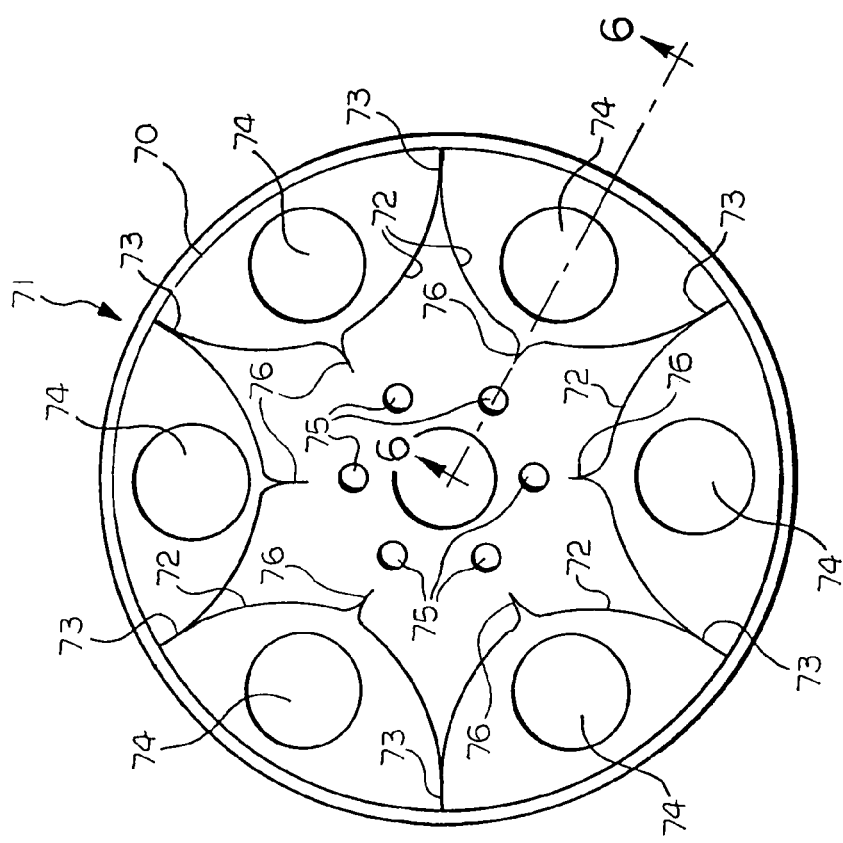

FIGS. 5a–5c are exemplary adhesive patterns which include both primary adhesive patterns and the auxiliary adhesive patterns according to the present invention. FIG. 5a depicts an embodiment of the present invention which utilizes a primary adhesive pattern that is similar to that shown in FIG. 4a in which the primary adhesive pattern does not seal off areas between a wheel cover and a wheel. The primary adhesive pattern depicted in FIG. 5a includes a circular bead or line of adhesive 70 that extends along the outer peripheral edge of the wheel 71 and a series of adhesive beads or lines 72 that loop inward from the circular bead or line of adhesive 70. The loop beads or lines of adhesive 72 are shown as having common or overlapping leg portions 73 and apexes that are positioned between the decorative openings or windows 74 and the lug bolt openings 75.

The auxiliary adhesive pattern in FIG. 5a comprises discrete beads or lines of adhesive 76 that extend radially inward from the apex of each of the loop beads or lines 72 of adhesive of the primary adhesive pattern. The discrete beads or lines of adhesive 76 of the auxiliary adhesive pattern shown in FIG. 5a include free terminal ends that are near the lug bolt openings 75 and opposed bases which connect in the apexes of the loop beads or lines 72. As depicted in FIG. 5a, the bases of the discrete beads or lines of adhesive 76 of the auxiliary adhesive pattern connect to the apexes of the loop beads or lines 72 by curved segments which allow the auxiliary adhesive pattern to be formed in a continuous manner while forming the primaiy adhesive pattern, i.e. without interrupting the continous feed of adhesive from an automated dispensing apparatus.

FIG. 5b depicts an embodiment of the present invention which utilizes a primary adhesive pattern that is similar to that shown in FIG. 4b in which the primary adhesive pattern does not seal off areas between a wheel cover and a wheel. The primary adhesive pattern depicted in FIG. 5b includes an outer circular bead or line of adhesive 80 that extends along the outer peripheral edge of the wheel 81 and an inner circular bead or line of adhesive 82 that surrounds the lug bolt openings 83. In addition, the primary adhesive pattern depicted in FIG. 5b includes a single bead or line of adhesive 84 between each adjacent pair or the decorative openings of windows 85 that extends radially between the outer circular bead or line of adhesive 80 and the inner circular bead or line of adhesive 82.

The auxiliary adhesive pattern in FIG. 5b comprises discrete beads or lines of adhesive 86 that extend radially and are positioned between the beads or lines of adhesive 84 of the primary adhesive and the adjacent decorative openings of windows 85.

FIG. 5c depicts an embodiment of the present invention which utilizes a primary adhesive pattern that includes a circular bead or line of adhesive 90 that extends along the outer peripheral edge of the wheel 91 and a series of adhesive beads or lines 92 that have trapezoid shapes which extend inward from the circular bead or line of adhesive 90. The trapezoidal shaped beads or lines of adhesive 92 are shown as having common or overlapping leg portions 93.

The auxiliary adhesive pattern in FIG. 5c comprises discrete beads or lines of adhesive 94 that extend radially inward in alignment with the legs 93 of the trapezoidal shaped beads or lines of adhesive 92. The discrete beads or lines of adhesive 94 of the auxiliary adhesive pattern shown in FIG. 5a include opposite free terminal ends with the inner most free terminal end extending between pairs of lug bolt openings 95.

It is to be understood that the auxiliary adhesive patterns depicted in FIGS. 5a–5c are non-limiting examples of auxiliary adhesive patterns that can be used in combination with primary adhesive patterns according to the present invention. From the examples presented in FIGS. 5a–5c it is to be understood that the auxiliary adhesive patterns comprise discrete lines or beads of adhesive that extend at least partially into the areas that are not immediately secured by the primary adhesive patterns so as to prevent these areas from sounding hollow or from vibrating. As depicted in FIGS. 5a–5c, the discrete lines or beads of adhesive of the auxiliary adhesive patterns can have one or more terminal end(s) that is/are not connected to any portion of the primary adhesive pattern. In further embodiments, both ends of the discrete beads or lines of the adhesive of the auxiliary pattern can be connected to portions of the primary adhesive pattern; however, more desirable embodiments of the present invention do not include sealed pockets defined by any combination of the primary and auxiliary adhesive patterns in which air can become entrapped and compressed.

It is also noted that whereas the auxiliary adhesive beads or lines are depicted as being substantially linear, they could also be T-shaped, I-shaped, L-shaped, V-shaped, X-shaped, +-shaped, curved, etc. or have any shape, with shapes that form sealed pockets between the wheel cover and wheel, being acceptable, but less desirable for the reasons discussed above. According to the present invention neither the primary adhesive patterns nor the auxiliary adhesive patterns alone or in combination are applied and/or configured to provide a continuous layer of adhesive between the wheel covers and the wheels.

FIG. 6 is a cross-sectional view of a wheel assembly according to the present invention taken along section line VI—VI in FIG. 5a. In FIG. 6 the wheel has a recessed central portion 100 which is not shown in FIG. 5a. The wheel cover 101 in shown as being secured to wheel 102 by primary adhesive areas 103, 104 which correspond to the circular bead or line of adhesive 70 that extends along the outer peripheral edge of the wheel 101 and the loop beads or lines of adhesive 72 respectively. The decorative openings or windows 74 and lug bolt openings 75 in the wheel cover 101 are positioned over the decorative openings or windows 74' and lug bolt openings 75' in the wheel 102. The primary adhesive portion 103 is near the outboard bead seat retaining flange 106 of the wheel assembly 107. In FIG. 5a an auxiliary adhesive portion is identified by reference numeral 105 which corresponds to the discrete bead or line of adhesive 76 in FIG. 5a.

It is to be understood that the adhesive patterns of the present invention can be used in conjunction with wheel assemblies that use full or partial wheel covers, including wheel covers that extend over and cover the outboard bead seat retaining flange of wheels. In addition, although not shown, the adhesive patterns of the present invention can be used in conjunction with various known temporary or permanent mechanical engaging structures.

The present invention can use any conventional adhesive material. Moreover, the primary and auxiliary adhesive patterns can be composed of the same or different adhesive materials. Since the auxiliary adhesive patterns are not required or relied upon to secure the wheel covers to the wheels, they can be made from sound dampening materials that can cure to rigid or non-rigid states, but which do not have extremely strong adhesive properties and/or tensile strengths. However, foamable adhesives should generally be avoided, particularly when the outboard surface of the wheel and the wheel cover have similar contoured shapes. The adhesive patterns of the present invention that do not create sealed pockets between the wheel covers and wheels are particularly suitable for use in conjunction with air and/or moisture cured adhesives since the adhesive patterns allow air and moisture to reach the adhesive throughout the adhesive patterns.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A method of securing a wheel cover to a wheel to form a wheel assembly, which method comprises:

providing a wheel having an outboard surface with a plurality of centrally located lug bolt apertures formed in the outboard surface and a plurality of openings formed in the outboard surface and spaced radially outwardly from the lug bolt apertures;

providing a wheel cover having an inner surface and a plurality of centrally located lug bolt apertures formed in the wheel cover which correspond to the lug bolt apertures of the wheel, and a plurality of decorative openings formed in the wheel cover and spaced radially outwardly from the lug bolt apertures, which plurality of openings correspond to the plurality of openings formed in the wheel cover;

applying a primary adhesive pattern to at least one of the outboard surface of the wheel or the inner surface of the wheel cover;

applying an auxiliary adhesive pattern to at least one of the outboard surface of the wheel or the inner surface of the wheel cover; and assembling the wheel cover to the wheel to cause the primary and auxiliary adhesive patterns to contact both the outboard surface of the wheel and the inner surface of the wheel cover and thereby enable the adhesive pattern to secure the wheel cover to the wheel and define a space between the wheel cover and wheel which is not filled with adhesive, said primary adhesive pattern being sufficient to secure the wheel cover to the wheel and comprising a configuration of beads of adhesive that do not fill the entire space between the wheel cover and the wheel, said auxiliary adhesive pattern being insufficient to secure the wheel cover to the wheel and comprising a configuration of discrete beads of adhesive that are provided in portions of the space between the wheel cover and the wheel in which the wheel cover is not directly secured to the wheel by portions of the primary adhesive pattern.

2. A method of securing a wheel cover to a wheel to form a wheel assembly according to claim 1, wherein said primary adhesive pattern includes a configuration of beads of adhesive that after contacting both the outboard surface of the wheel and the inner surface of the wheel cover allows ambient fluids to enter throughout the space between the wheel cover and the wheel which is not filled with adhesive and exit the space.

3. A method of securing a wheel cover to a wheel to form a wheel assembly according so claim 1, wherein the discrete beads of adhesive of the auxiliary adhesive pattern have opposite terminal ends that are non-connected to the primary adhesive pattern.

4. A method of securing a wheel cover to a wheel to form a wheel assembly according to claim 1, wherein the discrete beads of adhesive of the auxiliary adhesive pattern have at least one opposite terminal end that is connected to the primary adhesive pattern.

5. A method of securing a wheel cover to a wheel to form a wheel assembly according to claim 1, wherein the discrete beads of adhesive of the auxiliary adhesive pattern are linear.

6. A method of securing a wheel cover to a wheel to form a wheel assembly according to claim 1, wherein the discrete beads of adhesive of the auxiliary adhesive pattern have curved portions.

7. A method of securing a wheel cover to a wheel to form a wheel assembly according to claim 1, wherein the primary adhesive pattern and the auxiliary adhesive pattern comprise a similar adhesive material.

8. A method of securing a wheel cover to a wheel to form a wheel assembly according to claim 1, wherein the wheel cover is made from one of a metal and a plastic material.

9. A wheel assembly which comprises:

a wheel having an outboard surface with a plurality of centrally located lug nut apertures formed in the outboard surface and a plurality of openings formed in the outboard surface and spaced radially outwardly form the lug nut apertures;

a wheel cover having an inner surface and a plurality of centrally located lug nut apertures formed in the wheel cover which are aligned with the lug nut apertures of the wheel, and a plurality of decorative openings formed in the wheel cover and spaced radially outwardly from the lug nut apertures, which plurality of openings are aligned with the plurality of openings formed in the wheel cover;

a cured primary adhesive pattern between the wheel and wheel cover which bonds the wheel and wheel cover together with a space between the wheel and wheel cover which space is not filled with the cured primary adhesive; and a cured auxiliary adhesive pattern that is insufficient to secure the wheel cover to the wheel and comprises a configuration of discrete beads of adhesive that are provided in portions of the space between the wheel cover and the wheel in which the wheel cover is not directly secured to the wheel by portions of the primary adhesive pattern.

10. A wheel assembly according to claim 9, wherein said cured primary adhesive pattern includes a configuration of beads of adhesive that allows ambient fluids to enter throughout the space between the wheel cover and the wheel which is not filled with cured primary adhesive and the cured auxiliary adhesive.

11. A wheel assembly according to claim 9, wherein the discrete beads of adhesive of the cured auxiliary adhesive pattern have opposite terminal ends that are non-connected to the primary adhesive pattern.

12. A wheel assembly according to claim 9, wherein the discrete beads of adhesive of the cured auxiliary adhesive pattern have at least one opposite terminal end that is connected to the cured primary adhesive pattern.

13. A wheel assembly according to claim 9, wherein the discrete beads of adhesive of the auxiliary adhesive pattern are linear.

14. A wheel assembly according to claim 9, wherein the discrete beads of adhesive of the auxiliary adhesive pattern have curved portions.

15. A wheel assembly according to claim 9, wherein the cured primary adhesive pattern and the cured auxiliary adhesive pattern comprise a similar adhesive material.

16. A method of reducing hollow sounds in wheel assemblies, which method comprises:

providing a wheel having an outborad surface with a plurality of centrally located lug bolt apertures formed in the outboard surface and a plurality of openings formed in the outboard surface and spaced radially outwardly from the lug bolt apertures;

providing a wheel cover having an inner surface and a plurality of centrally located lug bolt apertures formed in the wheel cover which correspond to the lug bolt apertures of the wheel, and a plurality of decorative openings formed in the wheel cover and spaced radially outwardly from the lug bolt apertures, which plurality of openings correspond to the plurality of openings formed in the wheel cover, applying a primary adhesive pattern to at least one of the outboard surface of the wheel or the inner surface of the wheel cover, said primary adhesive pattern defining areas that will be hollow when the wheel cover and the wheel are bonded together by the primary adhesive pattern;

applying an auxiliary adhesive pattern to at least one of the outboard surface of the wheel or the inner surface of the wheel cover, said auxiliary adhesive pattern consisting of discrete beads of adhesive that will be positioned in the hollow areas defined by the primary adhesive pattern; and assembling the wheel cover to the wheel to cause the adhesive to contact both the outboard surface of the wheel and the inner surface of the wheel cover and thereby enable the primary adhesive pattern to secure the wheel cover to the wheel.

17. A method of reducing hollow sounds in wheel assemblies according to claim 16, wherein the discrete beads of adhesive of the auxiliary pattern have opposite terminal ends that are non-connected to the primary adhesive pattern.

18. A method of reducing hollow sounds in wheel assemblies according to claim 16, wherein the discrete beads of adhesive of the auxiliary pattern have at least one opposite terminal end that is connected to the primary adhesive pattern.

19. A method of reducing hollow sounds in wheel assemblies according to claim 16, wherein the hollow areas defined by the primary adhesive pattern include openings in the primary adhesive pattern through which ambient fluids can freely enter and exit.

20. A method of reducing hollow sounds in wheel assemblies according to claim 16, wherein the discrete beads of adhesive of the auxiliary adhesive pattern are linear.

21. A method of reducing hollow sounds in wheel assemblies according to claim 16, wherein the discrete beads of adhesive of the auxiliary adhesive pattern have curved portions.

* * * * *